United States Patent [19]
Watkins

[11] Patent Number: 6,097,554
[45] Date of Patent: Aug. 1, 2000

[54] MULTIPLE DOVE PRISM ASSEMBLY

[75] Inventor: Robert A. Watkins, Goleta, Calif.

[73] Assignee: Raytheon Company, Lexington, Mass.

[21] Appl. No.: 09/227,062

[22] Filed: Jan. 5, 1999

[51] Int. Cl.[7] .................................................. G02B 5/04
[52] U.S. Cl. ........................................ 359/833; 359/834
[58] Field of Search ................................. 359/831, 833, 359/625, 401, 403, 404, 834

[56] References Cited

U.S. PATENT DOCUMENTS

| | | | |
|---|---|---|---|
| 2,855,819 | 10/1958 | Luboshez | 359/669 |
| 3,320,019 | 5/1967 | Brunelle, Jr. et al. | 359/836 |
| 3,382,023 | 5/1968 | VanHorn, Jr. | 359/836 |
| 3,425,768 | 2/1969 | Kuhn et al. | 359/211 |
| 3,535,025 | 10/1970 | Shannon | 359/837 |
| 5,214,528 | 5/1993 | Akanabe et al. | 359/211 |
| 5,721,585 | 2/1998 | Keast et al. | 348/36 |

*Primary Examiner*—Cassandra Spyrou
*Assistant Examiner*—Euncha Cherry
*Attorney, Agent, or Firm*—William C. Schubert; Glenn H. Lenzen, Jr.

[57] ABSTRACT

The present invention is a derotation assembly comprised of a plurality of dove prisms with multiple reflecting surfaces, each with a normal axis intersecting a common rotation axis aligned orthogonally to an optical device. The reflecting surfaces are parallel to each other and orthogonal to the common rotation axis.

18 Claims, 6 Drawing Sheets

MULTIPLE DOVE PRISM ASSEMBLY

BACKGROUND OF THE INVENTION

1. Field of the Invention

The present invention relates in general to optical devices and in particular to an optical derotator incorporating multiple dove prisms configured as wave transmitting prisms.

2. Related Art

Optical systems, such as periscopic scanning devices, are used to view objects with a detector. However, optical systems without derotation devices introduce image rotation at a focus point of the optical system. In an ordinary periscope, the detector (eye) rotates to accommodate this image rotation. While rotating electronic detectors have been used, it is desirable for the detector to be fixed. Consequently, the detector is not presented with a true image orientation of the object being viewed.

One way to prevent rotation is to utilize a system of plural reflecting surfaces to modify an optical path of light rays of the optical system. Typically, at least three reflecting surfaces are introduced into the optical path of light rays to provide image derotation. However, the usual optical system with plural reflecting surfaces occupies too much space. Also, reflective systems may have uneven image illumination due to partial blockage.

Dove prisms are commonly used for major image derotation in refractive optical systems that require mechanical rotation of the optical system to provide 360° azimuthal coverage of the image, such as scanning devices. Those dove prisms are relatively expensive and large and bulky.

Therefore, what is needed is an optical assembly for efficiently and effectively causing image rotation that may also be used to derotate images which are rotated by other parts of an optical system. What is further needed is an optical derotation assembly that is relatively small and lightweight.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a derotation assembly.

The derotation assembly of the present invention is comprised of a plurality of dove prisms, in which the normal vectors to the reflecting surfaces intersect a common rotation axis aligned with that of an optical device. The reflecting surface normals are parallel to each other and orthogonal to the common rotation axis. In addition, the reflecting surfaces of adjacent pair of dove prisms, considered as separate subsystems are adjacent and non-reflecting surfaces of any two such subassemblies are adjacent.

A feature of the present invention is that the overall size of the derotation assembly is variable so that it can be relatively small in the axial direction. An advantage of the present invention is that a smaller derotation assembly reduces the size of optical systems utilizing the derotation assembly. Other advantages of the present invention are that a smaller derotation assembly provides corresponding savings in weight and raw material as well as reduced transmission loss due to absorbtion within the prism material. A further advantage, which results from the mounting of the prism elements, is reduced attenuation of the images of off-axis objects.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
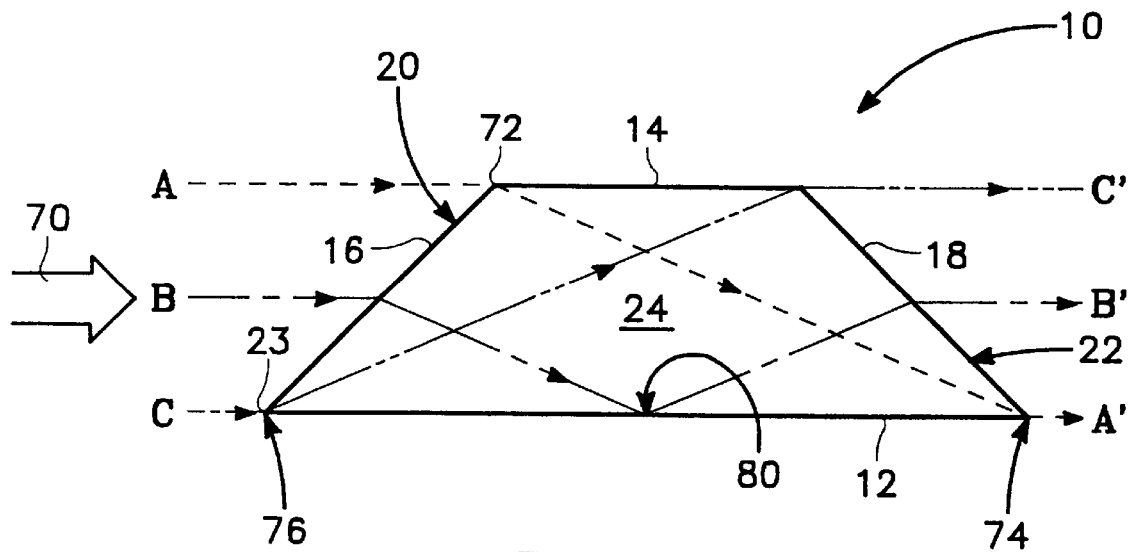
FIG. 1 is a side view of a dove prism used in the present invention.

FIG. 1 is a side view of a dove prism used in the present invention. The dove prism 10 is dovetail shaped and has a base 12, a roof 14, opposite sloping front and back faces 16, 18, comprising a first sloping entrance face 20 and a symmetrical second sloping exit face 22, and a first side 24 and a second side 26. The entrance and exit faces 20, 22 can be at a 45° angle to the base 12 for ease of manufacture. However, various angles can be used to provide better effective apertures at sizeable angles off axis.

Figure 2:
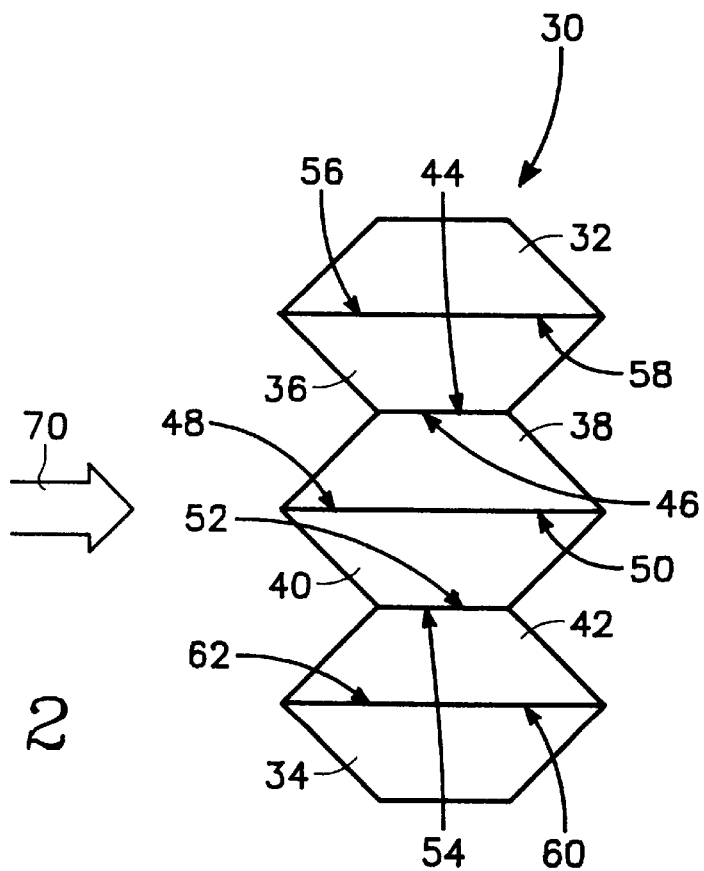
FIG. 2 is a side view of the multiple dove prism assembly of the present invention.
Figure 3:
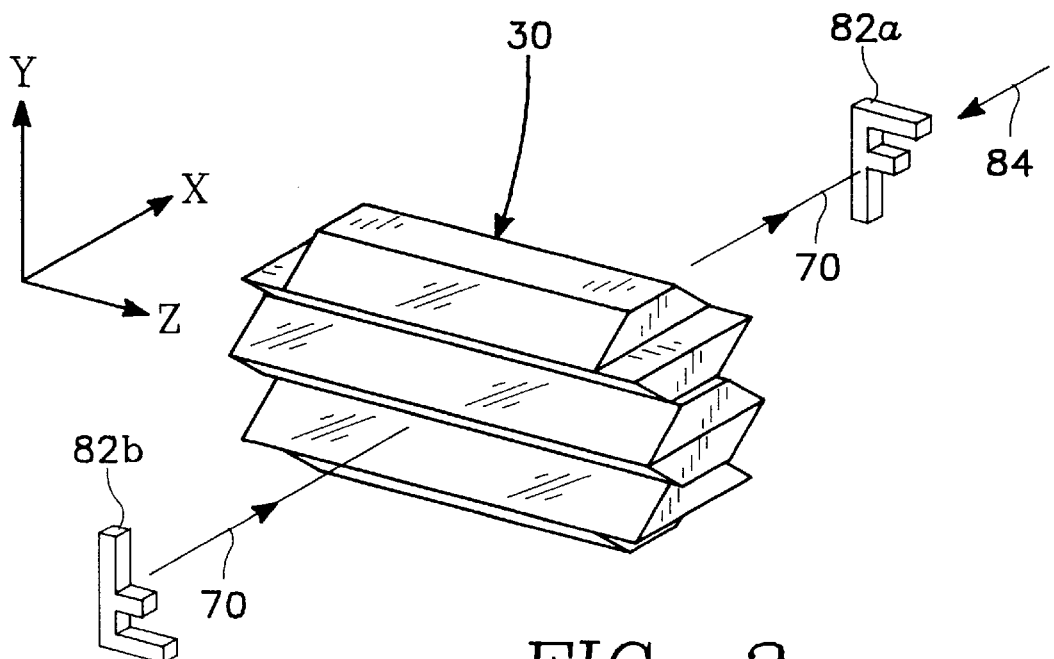
FIG. 3 is a perspective view of the multiple dove prism assembly of the FIG. 2.

FIG. 2 is a side view of the multiple dove prism assembly of the present invention. FIG. 3 is a perspective view of the multiple dove prism assembly of the FIG. 2. A plurality of dove prisms 10 (described in FIG. 1) creates an optical derotation device in the form of a multiple dove prism assembly 30 as will be described below. It should be noted that it is not necessary to have an even number of dove prisms as shown in FIG. 2. For instance, some conditions may allow the use of five prisms instead of the six prisms shown in FIG. 2. Thus, an even number of dove prisms will be described below for illustrative purpose only.

The multiple dove prism assembly 30 shown in FIG. 2 comprises first and second end dove prisms 32, 34 and a plurality of intermediate dove prisms 36, 38, 40, 42 assembled together. A roof 44 of a first intermediate dove prism 36 abuts to a roof 46 of an adjacent second intermediate dove prism 38. A base 48 of the second intermediate dove prism 38 abuts to a base 50 of an adjacent third intermediate dove prism 40. A roof 52 of the third intermediate dove prism 40 abuts to a roof 54 of an adjacent fourth intermediate dove prism 42. Also, a base 56 of the first end dove prism 32 abuts to a base 58 of the adjacent first intermediate dove prism 32 and a base 60 of the second end dove prism 34 abuts to a base 62 of the adjacent fourth intermediate dove prism 42. It should be noted that the orientation of the adjacent abutting members are preferably parallel to each other (for the reasons described below, with accuracy set by resolution considerations.

Referring back to FIG. 1 along with FIGS. 2 and 3, collimated light or a collimated wave, comprising a fan of light rays travels through each dove prism of the multiple dove prism assembly. The fan of light rays travels in the direction indicated by arrow 70. The entire path of the fan of light rays traveling from each entrance face to each exit face through each dove prism will be referred to as a path length.

The fan of light rays entering and exiting each dove prism is illustrated by, for example, letters A, B, and C, and A', B', and C', respectively. Each dove prism must be transparent to the fan of light rays being transmitted. The light ray A enters each dove prism at an upper entrance corner 72 defined by the roof 14 and the entrance face 20. The light ray A is immediately refracted to a point on the base 12 near a lower exit corner 74 of each dove prism, which is defined by the base 12 and the exit face 22. At the point on the base 12, the light ray A is reflected and then near the lower exit corner 74, it is refracted out of each dove prism as light ray A'.

Similarly, the light ray C enters each dove prism at a point near lower entrance corner 76 defined by the base 12 and the entrance face 20. The light ray C is immediately refracted to a point on the base 12 then reflected from the point on the base 23 to the back face 18. At the back face 18, the light ray C is refracted out of the dove prism as light ray C'. The light ray B enters each dove prism at the front face 16 at a height between that of rays A and C. The light ray B is immediately refracted to a bottom inside surface 80 of the dove prism. At the bottom inside surface 80, the light ray B is reflected to the back face 18 where it is refracted out of each dove prism as light ray B'. Thus, all the light rays A, B and C are first refracted at the front face 16, reflected at the base 12, and then refracted at the back face 18 out of each dove prism. Consequently, the fan of light rays A, B, and C travelling through each dove prism is inverted in order as light rays A', B', and C' which, in a properly fabricated prism, are parallel to rays A, B, and C. Each ray undergoes the refraction-reflection-refraction process at surfaces 16, 80, 22.

The length of the base 12 of the dove prism 10 must be sized so that the refracted rays strike the base 12 before reaching the exit face 22 as shown in FIG. 1. It should be noted that increasing the height beyond a calculatable optimum value (set by the length, index of refraction and vertex angles of the dove prism 10) from the base 12 to the roof 14 does not increase the height of the "useful" fan of light rays. This is because additional light rays allowed to enter the dove prism 10 due to the increase in height will strike the exit face 22 without the base reflection. Thus, an optimum height to base ratio is derived from the refractive index of the prism material and vertex angles.

If the fan of light rays entering the dove prism 10 is inclined at an angle with respect to the base 12, then vignetting will occur. For example, with a fan of light rays entering the dove prism 10 at a large upward inclined angle, the light rays entering near the base 12 of the dove prism 10 will travel through the prism intersecting the back face 18 below the roof 14, effectively excluding the upper part of the prism. Similarly, light rays entering near the roof 14 reach the back face 18 without undergoing reflection at the base 23. These light rays may be internally reflected at back face 18, rather than refracted and thus "lost", or may exit the prism in a direction different from that which is required for normal operation.

Figure 6:
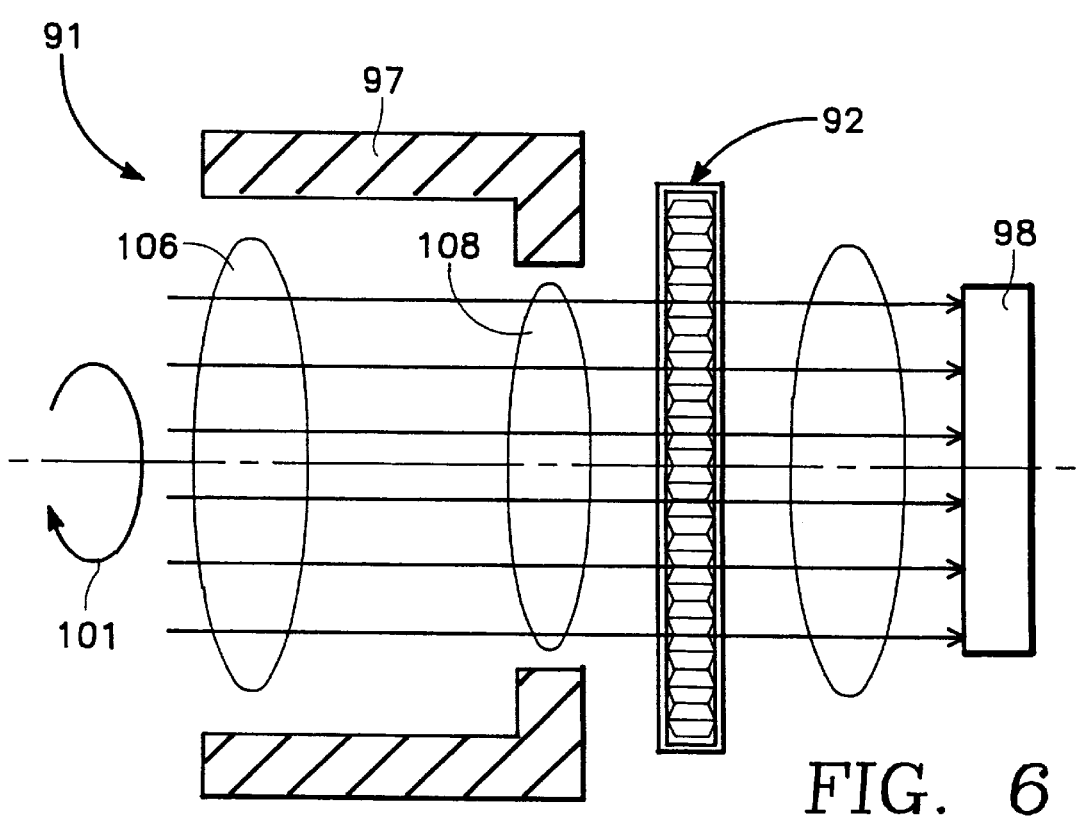
FIG. 6 is a second embodiment of a tracking device with the multiple dove prism of the present invention.

For a fan of light rays entering the dove prism 10 at a downward angle, the light rays entering near the base 12 of the dove prism 10 will strike the base 12 and reflect to the roof 14, without travelling through the exit face 22. Thus, the height of the fan of light rays which passes through the prism with the proper refraction-reflection-refraction sequence is reduced as a function of inclination as they enter the dove prism 10. Snell's law of refraction can be used to properly arrange the geometry of the light rays and the dove prism 10. It is also noted that the thickness of each dove prism 10 can vary so as to accommodate a circular optical aperture as shown in FIG. 6.

The advantage of the mounting of the individual dove prisms as shown in FIG. 2 and described above is that the effective optical height of the prisms is maintained for off axis targets. This is not the case if the prisms were all mounted with the reflecting surfaces corresponding to 80 in FIG. 1 were mounted adjacent to the roofs (14 as shown in FIG. 1) of the next prism. In this mounting arrangement, parts of the ray fan that would normally hit the upper part of a prism would be intercepted by the wider base of the prism mounted above it for targets which have ray fans inclined downward. Similarly, the rays of ray fans inclined upward that strike the underside of the upper prism are not used and if not controlled may be detrimental to system operation. These losses are greater than those due to the reduction in effective prism height discussed above.

Table I illustrates the optimum relative height to base length of dove prism with index of refraction of 1.6 as a function of entrance angle.

TABLE I

| ANGLE OFF AXIS | RELATIVE HEIGHT |
| --- | --- |
| 10 | 1.10505 |
| 8 | 1.08427 |
| 6 | 1.06321 |
| 4 | 1.04205 |
| 2 | 1.02093 |
| 0 | 1 |
| −2 | 0.97934 |
| −4 | 0.95906 |
| −6 | 0.93920 |
| −8 | 0.91984 |
| −10 | 0.90099 |

The multiple dove prism assembly 30 produces image rotation when rotated about an axis of rotation 70 as shown in FIG. 3. Referring back to FIG. 3, light rays travelling through the dove prisms in a plane perpendicular to the light rays A, B, and C maintain their order. An image, 82a of a target 82b (as it would appear to an observer in the absence of this prism assembly) is shown in a plane perpendicular to the dove prism assembly's 30 axis of rotation, i.e. The image 82a comprises a fan of light rays, and appears inverted relative to the target 82b, but still maintains its left-right characteristics, when viewed in the direction indicated by arrow 84 through the multiple dove prism assembly 30, as shown in FIG. 3.

Figure 4:
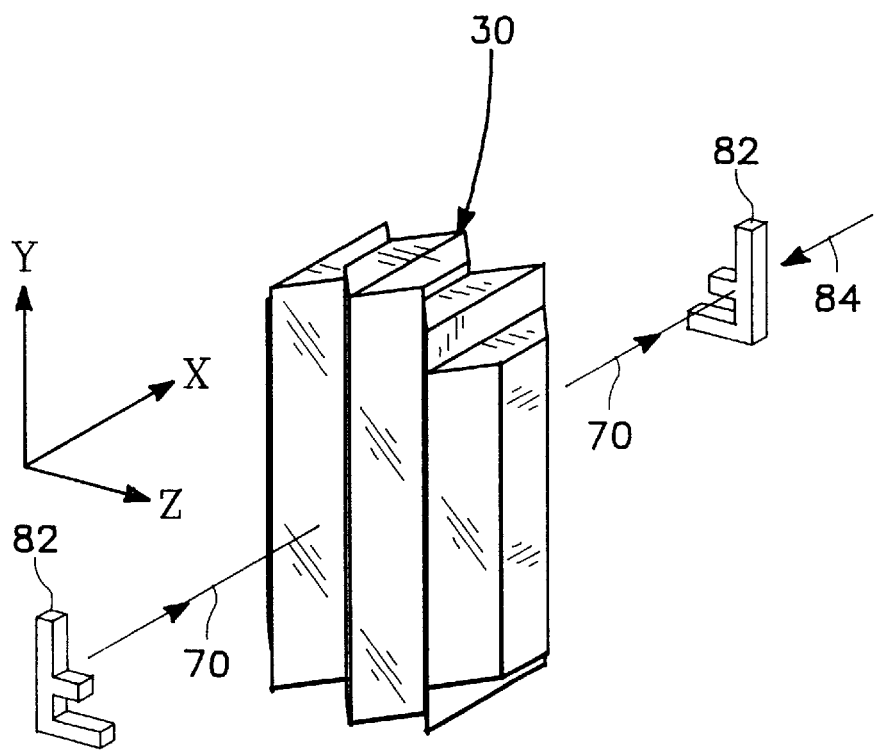
FIG. 4 is a perspective view of the multiple dove prism assembly of the FIG. 2 rotated 90 degrees.

FIG. 4 is a perspective view of the multiple dove prism assembly of the FIG. 3 rotated 90 degrees. It follows that if the multiple dove prism assembly 30 is rotated 90° around the x axis, as shown in FIG. 4, the image 82b would appear to have upright characteristics but reversed left-right characteristics (due to the inverted fan of light rays A', B', and C') when viewed through the multiple dove prism assembly 30.

Thus, if the image 82 were rotated 180° by some other optical means, in order to create the appearance that the image was not rotated the multiple dove prism assembly 30 must be rotated 90° around the x axis. This effectively derotates the image for viewing purposes in the direction indicated by arrow 84. Thus, the image rotation angle is twice that of the mechanical rotation angle. The multiple dove prism assembly 30 produces image rotation about an axis that is congruent with a mechanical axis of rotation.

Applications:

The multiple dove prism assembly of the present invention can be used for image derotation in optical systems that require mechanical rotation of an optical assembly and, for example, to provide 360° azimuthal coverage of an image, and which would as a result cause undesired rotation of the image on or at a fixed sensor. One such type of optical device is a periscope with rotatable fore optics and a fixed sensor. Another use of the dove prism array is for image rotation in an optical tracking device.

Figure 5:
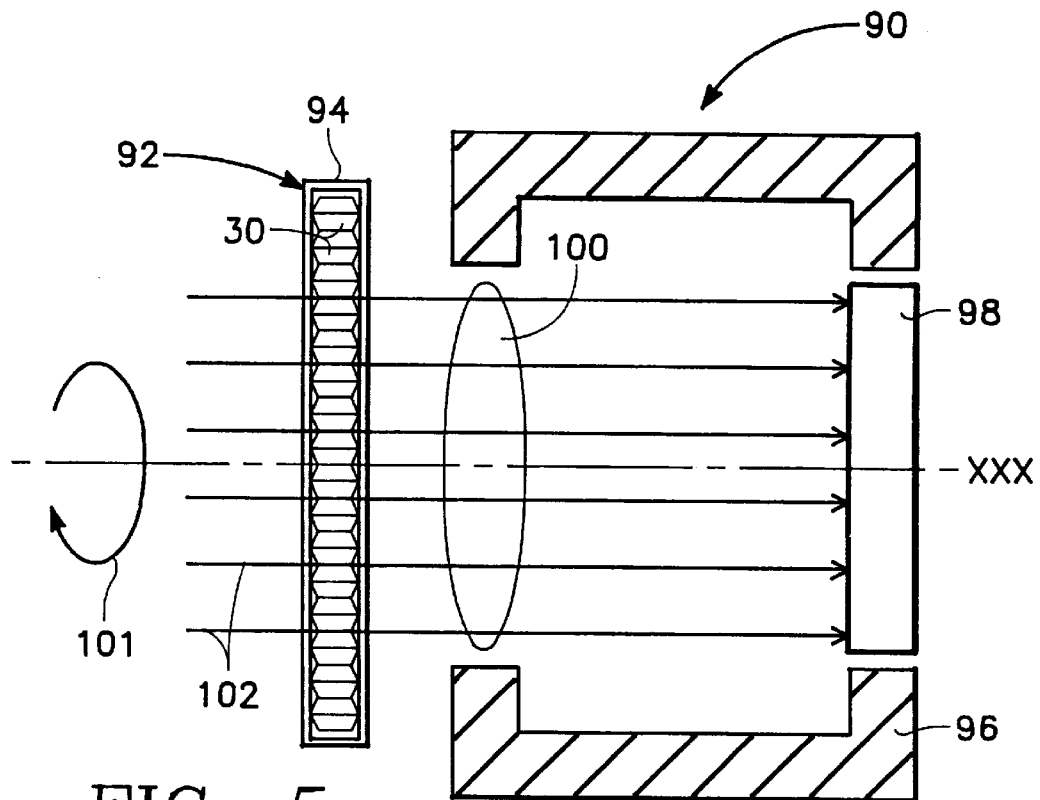
FIG. 5 is a first embodiment of a tracking device with the multiple dove prism assembly of the present invention.

FIG. 5 is a first embodiment of a tracking device of the present invention. The tracking device 90 includes an optical assembly 92 comprising the multiple dove prism assembly 30 mounted within an optical aperture 94. Also, the tracking device 90 includes a telescope 96, typically comprised of a detector 98 for detecting images, and an optical receiver 100, such as a lens, all having a common optical axis xxx. The dove prism assembly 30 is located in front of the telescope 96. When the dove prism assembly 30 is rotated on an axis coinciding with the optical axis xxx in a direction indicated by arrow 101, the image rotates on the detector 98 at twice the angular speed of the dove prism assembly. The detector and its associated electronics (not shown) are configured to translate the motion of the image on the detector 98 into usable up-down, left-right signals, or other signals suitable for providing a tracking function relative to the optical system axis xxx. An example of a detector arrangement that can be used in a tracker is a line of detectors with the end element at the system axis. As the image of a nominal point source rotates, it will cross the one of the detectors which corresponds to the radial angle off axis. The time of crossing is dependent on the direction of its displacement from the axis. This data can be converted to X-Y or ρ-θ errors with conventional electronic circuits well known in this field.

FIG. 6 is a second embodiment of a tracking device of the present invention. In this embodiment, a telescope 97, comprised of lenses 106 and 108 is preferably afocal, or nearly afocal. Telescope 97 is placed in front of the tracking device 90 of FIG. 5 with its optical axis coincident with that of the tracking device 90. Operation of the device of FIG. 6 is similar to the device of FIG. 5, but the additional telescope allows greater design freedom in generating the tracking system field of view.

Figure 7:
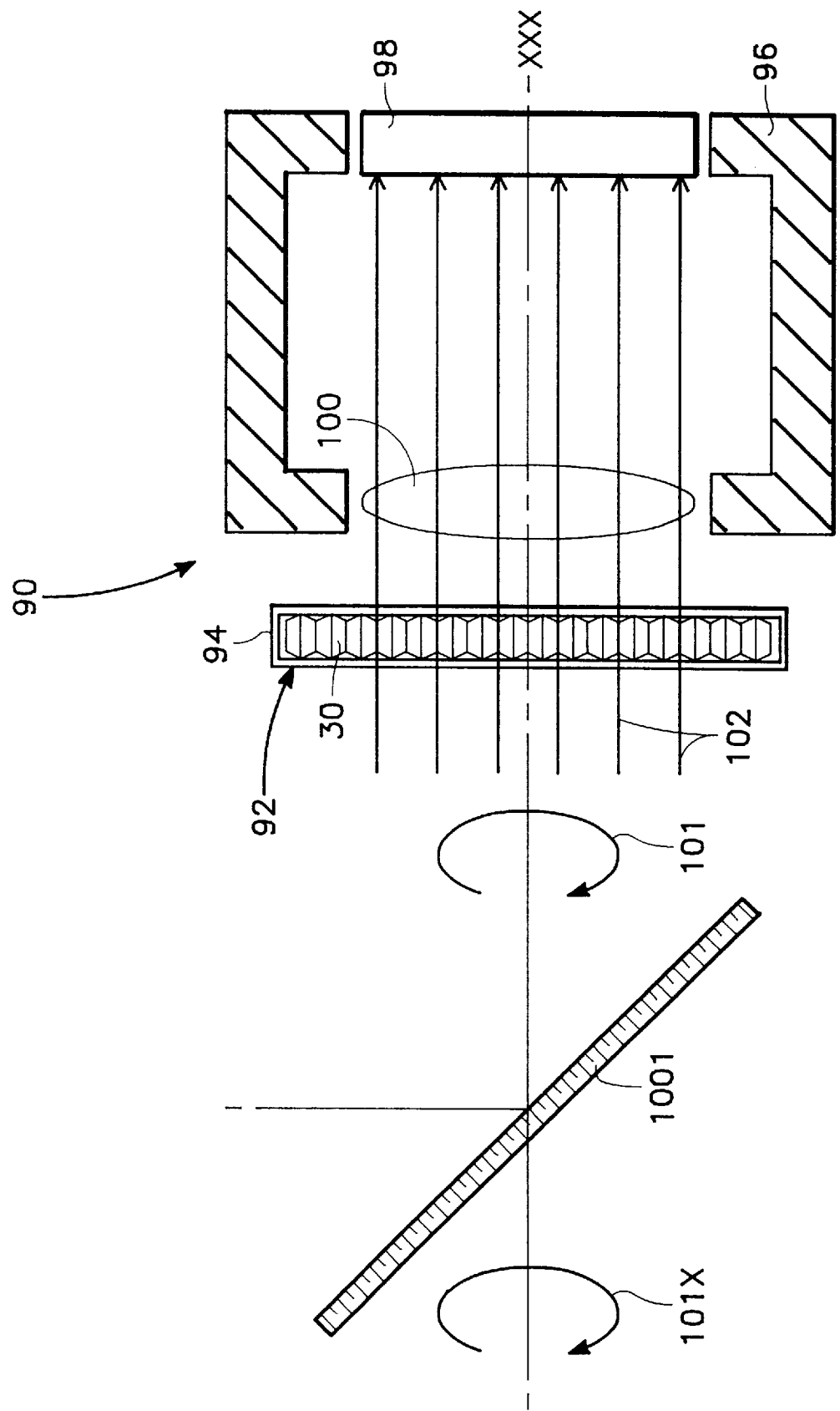
FIG. 7 is a first embodiment of a scanning device with the multiple dove prism assembly of the present invention.

A first embodiment of the dove prism assembly used for image derotation in a scanning system is shown in FIG. 7. The system consists of a mirror 1001 mounted at 45° to the external optical axis of an assembly similar to that of the tracker 90 described above. The mirror 1001 is rotated at an angular rate 101x on a mechanical axis coincident with the optical axis of tracker 90 which for the purpose of illustration, is assumed to be vertical. As the mirror 1001 rotates, the image of successive points on the horizon corresponding to the scanned position of the system optical axis, will be imaged at the center of detector 98. However, segments of the horizon image, which change with the mirror 1001 position, rotate on the detector 98 at a speed corresponding to that of the mirror rotation (one rotation for each revolution).

In the case of a scanner, this image rotation is undesirable, but is removed by rotation 101 of the dove prism assembly 94 at a speed half that of the diagonal mirror 1001 rotation. Such a system has a nonrotating image at the detector, although there is still the desired scanning of the image past the detector. The detector 98 is usually in a different format from that which would be used in tracking applications.

Figure 8:
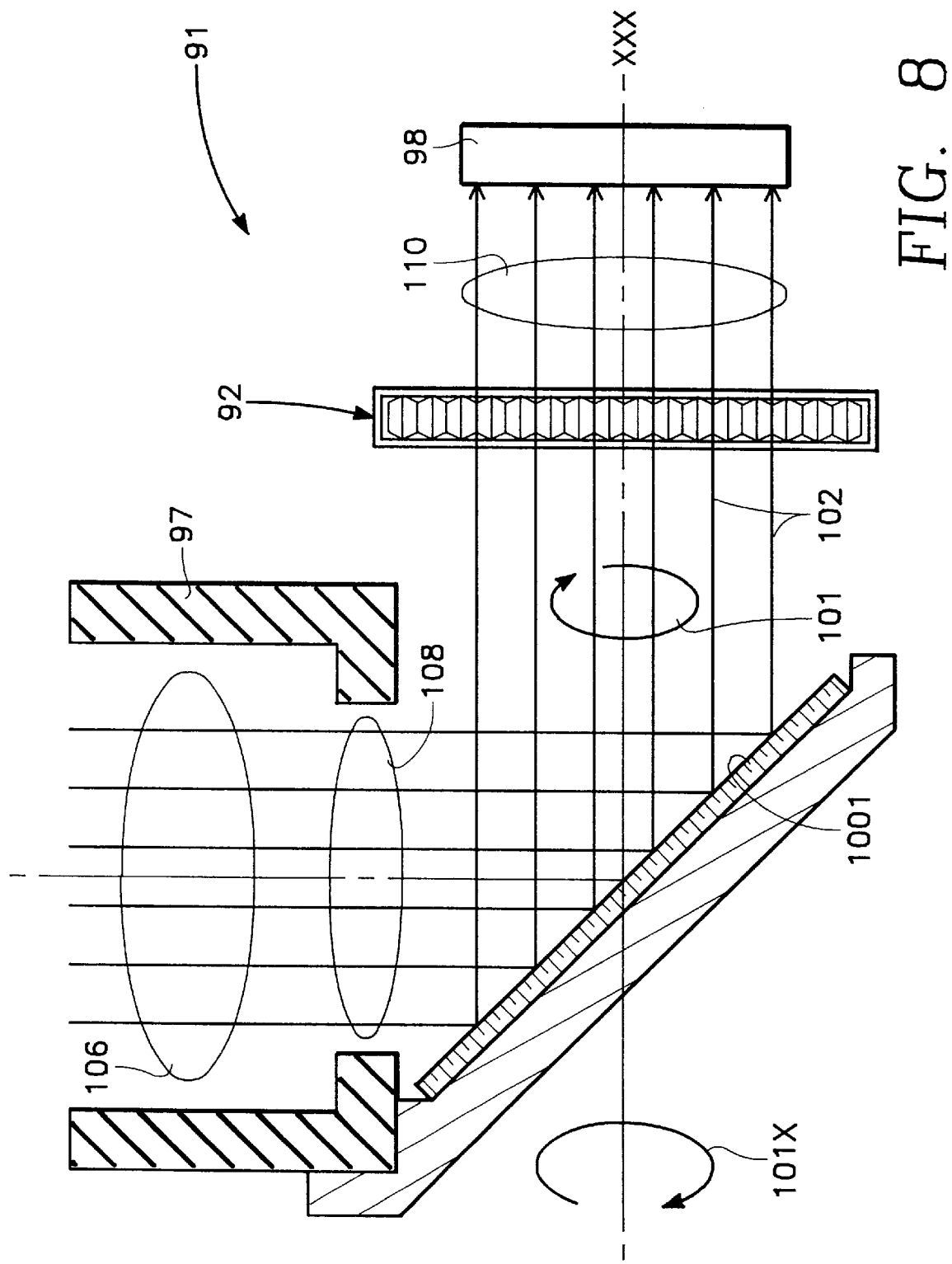
FIG. 8 is a second embodiment of a scanning device with the multiple dove prism of the present invention.

A second embodiment of the prism assembly in a scanning application is shown in FIG. 8. This embodiment corresponds to FIG. 6 for a tracker, except that the diagonal mirror 1001 has been added and the subsystem comprised of the diagonal mirror 1001 and the afocal telescope 91 are mechanically linked with the telescope axis in the plane of the scanning motion, which for the purpose of illustration will be taken as a horizontal plane. This assembly of mirror and telescope is rotated at angular rate 101x and, in the absence of the dove prism assembly, would result in both a scanning of the image across and a rotation of the image at detector 98. When the dove prism assembly is rotated at angular rate 101 equal to half that of 101x, the image is stabilized against rotation as discussed above.

Figure 11:
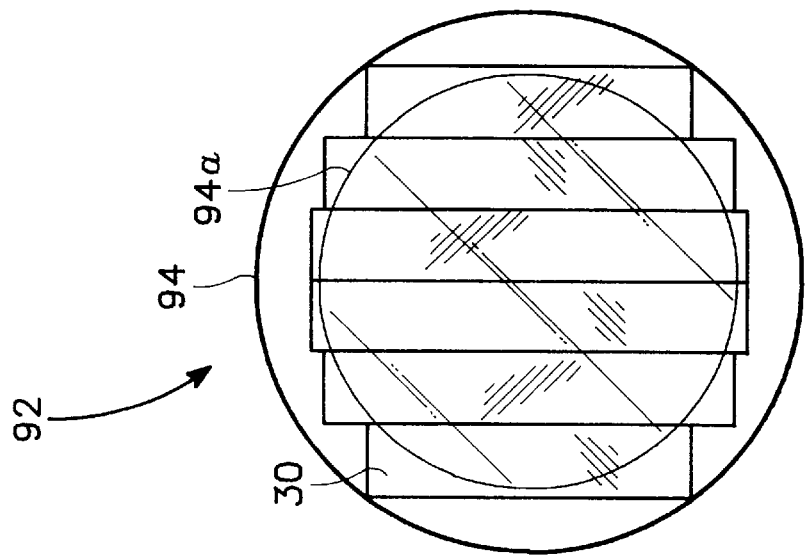
FIG. 11 is a front view of the device of FIG. 9 rotated 90 degrees.
Figure 10:
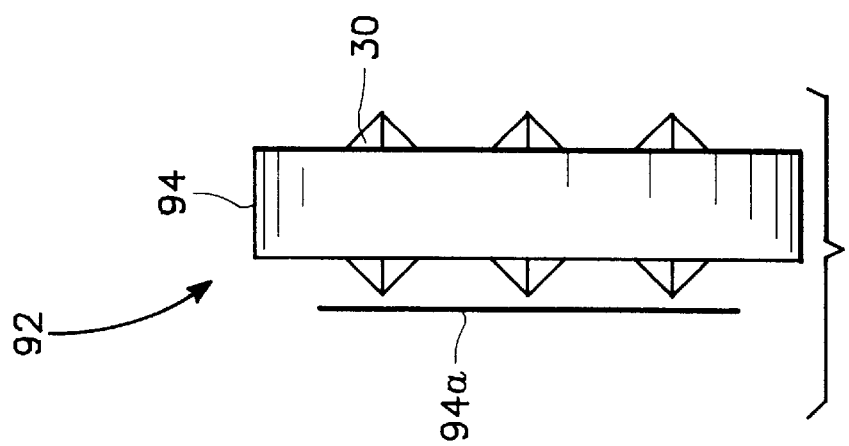
FIG. 10 is a side view of the device of FIG. 9.
Figure 9:
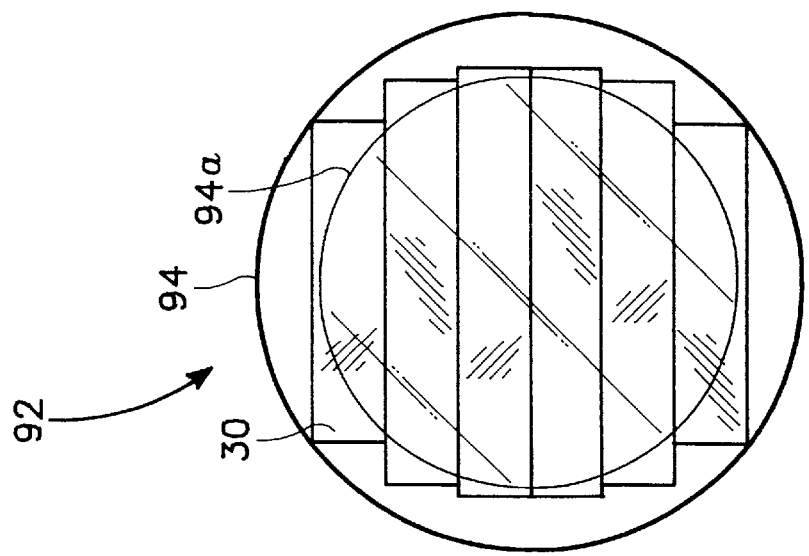
FIG. 9 is a front view of the optical assembly of the multiple dove prism assembly of FIG. 5.

FIG. 9 is a detailed front view and FIG. 10 is a detailed side view of the dove prism assembly of the present invention. FIG. 11 is a detailed front view of the dove prism assembly of the present invention rotated 90 degrees. A mechanical rotating part 94a can be used to hold the prisms together. As shown in FIGS. 9 and 10, the edges of the dove prisms can be truncated to fit within the optical aperture 94. The optical aperture 94 can be physically located near the prisms or may be projected to/on them from some other location in the optical system, which is well known in the art and will not be discussed in detail. Also, the optical aperture 94 is smaller than the mechanical rotating part 94a so that it can be covered by the prisms.

It should be noted that the rotational axis of the image does not have to pass through a dove prism assembly, as long as the rotational axis is parallel to the base, or reflecting surface of the dove prisms. As a result, N dove prisms can be combined to provide an entrance aperture N times greater than that of a single dove prism of the same height (the distance between base 80 and roof 14 of FIG. 1). It should be noted that height is determined by length in an optimum system.

For example, a single dove prism constructed of silicon with an index of refraction of 3.42427 has a height, and therefore an entrance aperture 0.39 times the base length. Consequently, to provide coverage for a two inch diameter optical aperture, an ordinary single dove prism would have to be at least two inches high and would be over five inches long.

In contrast, a two inch optical aperture could be accommodated with a multiple dove prism comprised of an array of 6 prisms, each ⅓ inch high and with a base of 0.855 inches, as shown in FIGS. 2–8. As a result, 83 percent material is saved and the optical system is shortened by four inches. Each dove prism edge is truncated so as to just enclose the two inch diameter aperture for the optical source.

The present invention could be extended to even larger numbers of prisms with a corresponding savings in material and system length. However, as discussed above, it must be recognized that the dove prisms have to be parallel to within the resolution requirements of the system. For example, for a 1 milliradian infrared system, the variance in parallelism of the prisms must be less than 0.5 milliradians. In typical visual or photographic systems the tolerance is much less.

Without the multiple dove prism of the present invention or with some other dove prisms or other derotators, images viewed by a fixed observer appear to rotate. In the course of one complete 360° mechanical rotation of the optical part 94, the image projected by light rays 102 appears to rotate from a normal aspect image, to an "on edge" aspect image, to an inverted image, to "on edge" image in the opposite sense, and finally to a normal image. Therefore, the optical part 94 of the present invention derotates the appearance of the image as the optical part rotates 94 to thereby force the image to remain upright throughout a scan of the image, i.e. rotation of the optical receiver 100.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical derotator, comprising:

a pair of dove prisms comprising a first and second dove prism, wherein each dove prism has oppositely sloping faces defined by an entrance face and an exit face, a roof surface and a base surface, wherein said base surface of each dove prism being longer in length than each of said roof surface, and wherein said base surface of said first dove prism abuts against said base surface of said second dove prism to couple said dove prisms together; and a collimated wave, comprising a fan of light rays traveling through each dove prism;

wherein said pair of dove prisms is a wave transmitting device and wherein said wave transmitting device is rotatably movable.

2. The optical derotator of claim 1, wherein said sloping entrance face is symmetrical to said sloping exit face.

3. The optical derotator of claim 1, wherein said sloping faces are defined by a predetermined angle sufficient to produce superior effective apertures at sizeable angles off axis.

4. The optical derotator of claim 1, wherein said sloping entrance and exit faces are at 45° angles to respective base surfaces.

5. The optical derotator of claim 1, wherein said base surfaces of the abutting dove prisms are parallel to one another.

6. The optical derotator of claim 1, wherein each base surface is sized so that refracted rays strike said base surfaces before reaching said sloping exit faces.

7. An optical derotator, comprising:

a plurality of dove prisms each having oppositely sloping faces defined by an entrance face and an exit face, a roof surface and a base surface, wherein said base surface being longer in length than said roof surface;

wherein said plurality of dove prisms are comprised of a series of dual pairs, wherein each dual pair comprises a single dove prism coupled to another single dove prism at abutting and facing base surfaces and wherein said series of dual pairs are defined by dual pairs coupled to one another at abutting and facing roof surfaces; and a collimated wave, comprising a fan of light rays traveling through each dove prism;

wherein said dove prisms are configured as wave transmitting prisms and wherein said plurality of dove prisms are rotatably movable.

8. The optical derotator of claim 7, wherein said sloping entrance face is symmetrical to said sloping exit face.

9. The optical derotator of claim 7, wherein said sloping faces are defined by a predetermined angle sufficient to produce superior effective apertures at sizeable angles off axis.

10. The optical derotator of claim 7, wherein said sloping entrance and exit faces are at 45° angles to respective base surfaces.

11. The optical derotator of claim 7, wherein said base surfaces of the abutting dove prisms are parallel to one another.

12. The optical derotator of claim 7, wherein each base surface is sized so that refracted rays strike said base surfaces before reaching said sloping exit faces.

13. The optical derotator of claim 7, wherein said plurality of dove prisms is a dove prism assembly mounted within an optical aperture and wherein said optical derotator further comprises:

a telescope comprised of a detector for detecting images projected onto said detector and an optical receiver for receiving said images, wherein said detector and said optical receiver have a common optical axis;

wherein said dove prism assembly being located in a front position of said telescope; and a device for rotating said dove prism assembly on an axis coinciding with said optical axis so that said projected image rotates on said detector at twice the angular speed of said dove prism assembly.

14. The optical derotator of claim 13, further comprising a tracking device for translating said detector in order to translate motion of said image on said detector into at least one of usable up-down, left-right signals, and signals suitable for providing a tracking function relative to said optical system axis.

15. The optical derotator of claim 7, wherein said plurality of dove prisms is a dove prism assembly mounted within an optical aperture and wherein said optical derotator further comprises:

a telescope comprised of a detector for detecting images projected onto said detector, an optical receiver for receiving said images, and a back lens, wherein said detector, said optical receiver, and said back lens have a common optical axis, wherein said optical receiver comprises a plurality of nearly afocal lenses, and wherein said dove prism assembly being located between said optical receiver and said back lens;

a device for rotating said dove prism assembly on an axis coinciding with said optical axis so that said projected image rotates on said detector at twice the angular speed of said dove prism assembly.

16. The optical derotator of claim 14, further comprising a mirror mounted at 45° to an optical axis of said tracking device, wherein said mirror is rotated at an angular rate on a mechanical axis coincident with said optical axis of said tracking device so that as said mirror rotates, successive image points of a horizon image corresponding to a scanned position of said optical axis are imaged at a center of said detector and segments of said horizon image change with a position of said mirror and rotate on said detector at a rotational speed corresponding to said mirror as one rotation for each revolution.

17. The optical derotator of claim 15, further comprising a diagonal mirror.

18. The optical derotator of claim 17, wherein said diagonal mirror and said telescope are mechanically linked with a telescope axis in a plane of scanning motion.

\* \* \* \* \*